Figure 5:
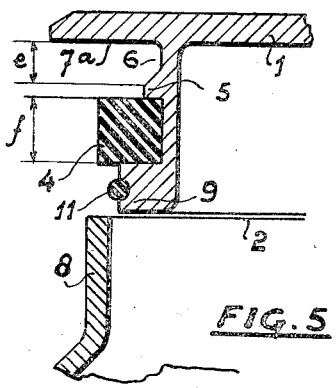

April 6, 1954
C. A. MEYER
2,674,472
JOINT
Filed Feb. 13, 1950
2 Sheets-Sheet 1
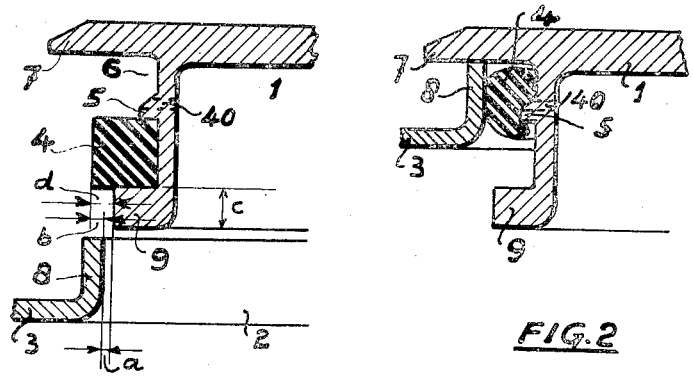
FIG. 1
FIG. 2
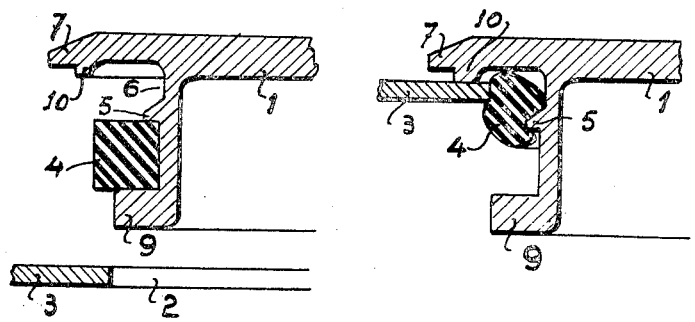
FIG. 3
FIG. 4
Inventor
Cornelis A. Meyer
By Watson, Cole, Grindle & Watson
Attorneys April 6, 1954

C. A. MEYER 2,674,472

JOINT

Filed Feb. 13, 1950

2 Sheets-Sheet 2

Inventor
Cornelis A. Meyer
By Watson, Cole, Grindle & Watson
Attorneys

Patented Apr. 6, 1954

2,674,472

UNITED STATES PATENT OFFICE 2,674,472

JOINT

Cornelis A. Meyer, Bloemendaal, Netherlands, assignor to Van Leer's (Curacao) N. V., Willemstad, Curacao, a company of the Dutch Antilles Application February 13, 1950, Serial No. 143,935

Claims priority, application Netherlands February 17, 1949

2 Claims. (Cl. 285—163)

The present invention relates to joints, particularly to joints of the kind wherein one part is introduced into and connected with an opening provided in another part.

The one part may, for instance, be a stopper, cover or the like for a bottle, jar, can, barrel or the like, alternatively the one part may be the mouth of a bottle, jar, can or the like, and the opening that of a bell or cup shaped cover, cap or the like.

The invention may also advantageously be used, for instance, as a joint for pipes, in short it may be used in all cases where a connection is desired which may easily and rapidly be fixed and removed, and where a projecting part of one member can be introduced into an orifice or opening in the other. In the case of a pipe-joint the connection according to the invention may be effected in such a way that it disconnects itself automatically when a predetermined pressure-difference between inside and outside is exceeded.

The main object of the invention is to provide an improved joint of the kind in which the part to be fixed in the orifice or opening is provided with an elastic ring on its outer surface and with a shoulder over which said ring may roll when the part is introduced into the orifice or opening thereby effecting the closure or sealing of said orifice or opening.

Joints of this general character have been proposed hitherto and although such joints may ensure a hermetic seal when employed with skill and care, practice has shown some disadvantages particularly when the device is incompetently or carelessly handled.

Firstly, in the known arrangements one part may be introduced too far into the orifice thereby causing the ring to roll over and beyond the shoulder whereby the sealing effect is decreased or the seal is only able to stand a lower pressure-difference than might have been possible if the joint had been correctly made. This disadvantage is particularly manifest when the one part is placed eccentrically or in an inclined position with relation to the orifice; in such a case the possibility also arises that one part of the ring rolls too far whereas another part does not roll at all.

These disadvantages are increased if the one part, and the orifice have a cross-section other than circular.

Further, the known devices call for a special shape both of the outer surface of the one part, and the inner surface of the orifice, thereby rendering the arrangement relatively expensive to manufacture, and moreover, rendering this joint unsuitable for existing vessels, having a commonly shaped mouth or orifice.

Another object of the present invention is to overcome these disadvantages and according to the invention the one part is not only provided with the interrupted or continuous shoulder over which the ring is adapted to roll, but also with means adapted to limit the rolling movement of the ring.

This arrangement prevents the ring from rolling beyond the clamping shoulder and losing contact therewith whereas, moreover, the risk of incorrectly making the joint by incompetent or careless handling is greatly diminished.

Another advantage of the joint according to the invention is that it may easily be used for sealing other than circular orifices, hence orifices having an oval, triangular, square or rectangular shape, provided always that the corners are rounded.

Moreover, the device according to the invention is applicable for sealing orifices having a smooth inner surface, and hence, it does not call for a special profile of the inner surface of the orifice as is necessary in the known arrangements.

A further object of the invention is to provide a joint in which the means for limiting the rolling movement of the ring consists in a shoulder or a row of cans or the like which may abut against the rim or the bottom of the orifice or against other means limiting the orifice in axial direction thereby preventing the part from being introduced into the orifice so far that the ring rolls beyond the clamping shoulder.

According to a preferred embodiment of the invention the means here concerned consist of a second shoulder, row of cams, rises or interruptions against which the ring on further rolling may abut thereby preventing the ring from losing contact with the clamping shoulder.

In this embodiment preferably a groove is provided in which the ring finds room to pass its snap position, so that on introducing the one part into the orifice of the other at first a certain resistance has to be overcome which, however, suddenly changes into a force promoting further introduction of the part, and assisting in keeping the joint closed. This will be readily understood when it is realized that an annulus or ring of the type described, made of rubber or other resiliently and elastically deformable but only slightly compressible material, may be rolled about its circular toric "axis" until it is everted or turned inside out. This represents a half-revolution of the ring wherein the ring has attained another position of "equilibrium." It will be readily realized that approximately at the point of quarter-revolution the rolling or everting movement of the ring passes over a dead-center or snap position, upon either side of which there is a tendency to roll either backward to the original position of complete repose, or forward to the half-revolution or everted position of relative repose or equilibrium. This tendency is particularly well marked and the positions well defined in the case of a ring of polygonal cross-section, especially a square one. According to a further feature of the invention the distance between the two shoulders is less than the height of the elastic ring measured in axial direction, so that the ring will not lose contact with the first shoulder, and preferably does not attain its next position of equilibrium.

According to a still further feature of the invention the effect may be improved by providing a so-called retaining shoulder at such a distance from the clamping shoulder that the elastic ring may be accommodated between the two shoulders or rows of cams. Preferably, the external dimension of the retaining shoulder is made slightly less than the internal dimension of the orifice, and particularly in such a way, that the difference between these two dimensions is less than the difference between the outside dimension of the elastic ring (when being placed in tension on the one part) and the inner dimension of the orifice. Thereby the centering of the one part with respect to the orifice is facilitated, and moreover, employing the device in such an incompetent way that the effect of the invention might be interfered with is greatly diminished. A further feature of the invention in which the axial height of the holding-shoulder exceeds the thickness of the elastic ring in so far as it protrudes beyond the holding shoulder aids in the same direction.

Figure 6:
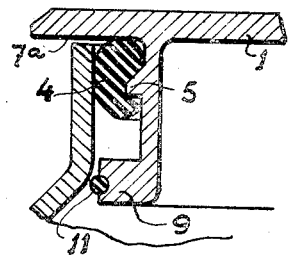
Figure 7:
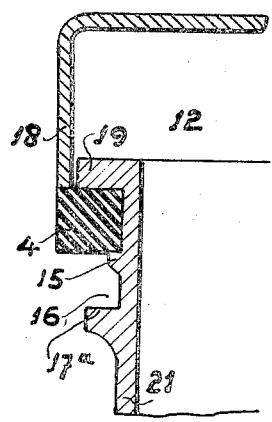
Figure 8:
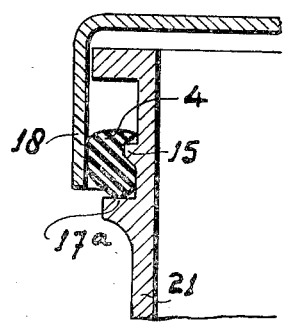
Figure 9:
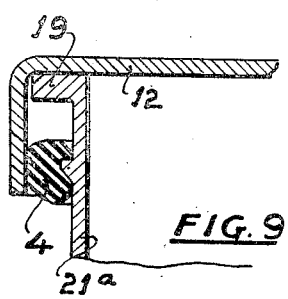
Figure 10:
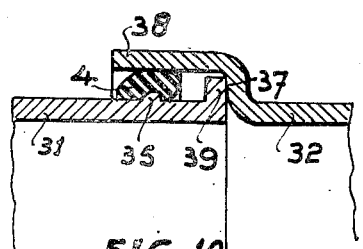

These and other objects, uses and advantages of the invention will be more clearly understood from the following detailed description. For purposes of facilitating understanding, reference will be had to the appended drawings, in which:

Figure 1 is a fragmentary longitudinal section showing the two parts to be sealed, the parts being shown in separated positions, Figure 2 a similar view showing the same cooperating parts in closed position, Figures 3 and 4 are views similar to Figures 1 and 2 of a modified form of stopper applied to a plane, or non-flanged, opening in a container, or the like, Figures 5 and 6 are similar views to Figures 1 and 2 showing a still further modification of the stopper or coupled member, Figures 7 and 8 illustrate, in open and closed position respectively, an embodiment of the invention in which the sealing ring is applied to the mouth or neck of a bottle or the like and the closure member is in the form of a bell or cup-shaped cover or cap, Figure 9 is a similar view of a modification of the arrangement shown in Figure 8, and Figure 10 is a longitudinal axial section of a pipe joint according to the invention.

Referring to Figures 1 and 2 of these drawings the part 1 is a stopper or closure member adapted to close an opening 2 in the wall of a container 3. The said stopper 1 is provided with an elastic ring 4 made of rubber, for instance, which on introduction of the stopper into the opening 2 abuts against the flange 8 of the container 3, and on further movement of the stopper rolls over the shoulder 5 to the position shown in Figure 2. At the commencement a certain resistance has to be overcome, until the ring 4 passes its snap or dead-center position and is constrained to complete its rolling movement and to relax in the groove 6 thereby promoting the further introduction of the stopper. The stopper 1, however, has a radial flange 7 which abuts against the flange 8 of the container wall 3 so that further movement of the stopper and hence also the rolling movement of the ring 4 is limited and the final position illustrated in Figure 2 is reached. As shown in Figure 2 the ring remains in contact with the shoulder 5 and is clamped between said shoulder and the bottom of the groove on the one part and the inner surface of the flange 8 on the other thereby effecting a hermetic seal of the opening 2 by the stopper 1. Moreover, the ring has not yet reached its next position of equilibrium so that it tends to roll on, and tighten the joint.

Furthermore the stopper is provided with a retaining shoulder 9 located at such a distance from the shoulder 5 that the ring 4 may be accommodated in the groove between said two shoulders. In order to facilitate a correct centering of the stopper relative to the opening this retaining shoulder fits in the opening with only a small clearance. This clearance, being twice the dimension $a$ is, according to the preferred embodiment as illustrated, less than the difference between the outer dimension of the ring 4 and the inner dimension of the opening 2; half of this difference is indicated by $b$ in the drawing, and hence $a < b$.

The retaining shoulder 9 has a height $c$ which is larger than the thickness $d$ of that part of the elastic ring which protrudes beyond this retaining shoulder. The purpose of this is to prevent further introduction of the stopper when, by incompetent handling, one part of the ring 4 is already inside the flange 8 whereas the other part is still above said flange. The retaining shoulder 9 has such a height that in such a case part of it abuts against the flange 8 thereby making impossible further introduction of the stopper.

Thus removal of the stopper 1 from the orifice 2 may easily be accomplished by simply lifting the stopper 1 for which purpose the radial flange 7 offers a useful grip. Inasmuch as the ring in the act of closing the container has not been entirely turned "inside out," again at the beginning a certain resistance has to be overcome; when the opening movement has proceeded to such an extent that the ring passes its snap position the latter at once starts promoting the further movement toward the removal of the stopper.

In the embodiment shown in Figures 3 and 4 the wall 3 of the container is plane and the stopper 1 is provided with a shoulder or number of cams 10 which abut against the wall 3 thereby preventing introduction of the stopper too far into the opening.

If the embodiments shown in Figures 1 to 4 are used for instance for sealing a glass container by means of a glass stopper there is a chance that the container or the stopper or both may be damaged by the blow with which the stopper engages the flange of the container. This possible disadvantage is eliminated in the construction illustrated in Figures 5 and 6. Here the rolling movement of the elastic ring 4 is limited because said ring abuts against the shoulder 7a of the stopper.

For this purpose, the volume of the annular space bounded by the shoulders 5 and 7a, the bottom of the groove 6 and the inner surface of the flange 8 is so small in relation to the volume of the ring 4 that turning over of the ring too far is prevented. In closed position the shoulder 7a does not touch the flange 8 of the container to be closed so that damage in this way is prevented.

Moreover, these figures illustrate a further improvement according to the invention. If the orifice serves as a spout and the container holds a lubricating substance such as oil or a sticky substance such as syrup or paint the possibility arises that the rolling movement of the ring when sealing the container or its roll-back when opening the container is impeded by remains of liquid on the inner surface of the flange 8. In order to prevent this the stopper is provided on its holding shoulder 9 with a second ring 11 also preferably made of elastic material which on introduction of the stopper scrapes and cleans the spout before the actual sealing ring 4 touches it. Of course, this scraping ring must be loosely fitting in the opening 2.

In the embodiment shown in Figures 7 and 8 the mouth or neck 21 of a bottle or the like is closed by means of a bell-shaped or cup-shaped cover or cap the orifice of which is indicated by 12. The mouth or neck of the bottle is provided with the elastic ring 4 located between a clamping shoulder 15 and a retaining shoulder 19. When the cap is placed over the mouth its flange 18 abuts against the ring 4 which rolls over the shoulder 15 into the groove 16 but which is caught by the shoulder 17a whereby the rolling movement of the ring is limited. In the final position shown in Figure 8 a hermetic seal is obtained by reason of the ring 4 being clamped between the shoulder 15, the groove 16 and the shoulder 17a on the part, and the inner surface of the flange 18 on the other part.

In Figure 9, which shows the closed position of an embodiment of the invention in which the mouth or neck of a bottle 21a is also closed by means of a cap, the rolling movement of the ring 4 is limited by the bottom of the cap contacting the holding shoulder 19 on the spout or the mouth. In this construction the mouth of the bottle is simpler because the shoulder 17a of Figures 7 and 8 may be omitted.

In Figure 10, which illustrates the closed position of an embodiment of the invention as applied to a pipe joint, the two pipe ends are indicated at 31 and 32. In this arrangement the pipe end 31 has an elastic ring 4 located between a clamping shoulder 35 and a retaining shoulder 39 which also serves as a centering means. The pipe end 32 has a socket 38 clamping the ring 4 on the shoulder 35 thereby rendering a tight connection between the two pipes. The flange 37 of the pipe 32 contacting the shoulder 39 of the pipe 31 prevents introduction of one pipe too far into the other thereby also limiting the rolling motion of the ring.

It will be understood that the constructions illustrated and described are only to be considered as examples of the invention, and various modifications may be made without departing from the scope of the invention. For instance, it is not necessary that the clamping shoulder have a continuous surface, also the retaining shoulder may be substituted by a number of cams, abutments or the like spaced around the circumference.

Furthermore, the field of application of the invention is not restricted to the examples shown and described; on the contrary, the invention may be usefully applied in all those cases in which a connection between two parts may be effected by using an orifice in one part in which a projecting part of the other member may be introduced.

Finally, it will be obvious to one skilled in the art that suitably located air-outlets 40 may be provided such as illustrated by way of example by dotted lines in the Figures 1 and 2.

What I claim as my invention is:

1. A joint structure comprising two members, one of which is provided with an annular wall defining an orifice, the other of said members adapted to be introduced into said orifice to establish sealing contact with the wall of the orifice, said second named member having an outer peripheral surface of a maximum diameter less than the diameter of the orifice, a resiliently deformable ring of elastic but substantially incompressible material and of polygonal cross-section surrounding and seated upon said peripheral surface, a clamping shoulder projecting abruptly radially outwardly from said surface and defining one side of the seat for said ring on which seat said ring is disposed when at rest in a substantially undistorted state of equilibrium in the unapplied position of the second named member, said ring having an outside diameter greater than the inside dimension of said orifice and said shoulder being of considerably less outside dimension than said orifice, whereby upon introduction of said second named member into said orifice the ring abuts the peripheral edge of the orifice and is tilted over said clamping shoulder and commences a distorting everting rolling movement along said surface, and a second radially outwardly projecting shoulder on said surface spaced from said first named shoulder in the direction of movement of said ring and adapted to be abutted by said deformable ring during such movement to limit the extent thereof, the axial distance between said clamping shoulder and said second named shoulder being such with respect to the circumference of cross-section of the deformable ring that the ring abuts against said second named shoulder before it rolls completely over said clamping shoulder and before it can reach a new position of equilibrium.

2. A joint structure comprising two members, one of which is provided with an annular wall defining an orifice, the other of said members adapted to be introduced into said orifice to establish sealing contact with the wall of the orifice, said second named member having an outer peripheral surface of a maximum diameter less than the diameter of the orifice, a resiliently deformable ring of elastic but substantially incompressible material and of polygonal cross-section surrounding and seated upon said peripheral surface, a clamping shoulder projecting abruptly radially outwardly from said surface and defining one side of the seat for said ring on which seat said ring is disposed when at rest in a substantially undistorted state of equilibrium in the unapplied position of the second named member, said ring having an outside diameter greater than the inside dimension of said orifice and said shoulder being of considerably less outside dimension than said orifice, whereby upon introduction of said second named member into said orifice the ring abuts the peripheral edge of the orifice and is tilted over said clamping shoulder and commences a distorting everting rolling movement along said surface, and a second radially outwardly projecting shoulder on said surface spaced from said first named shoulder in the direction of movement of said ring and adapted to be abutted by said deformable ring during such movement to limit the extent thereof, the axial distance between said clamping shoulder and said second named shoulder being such with respect to the circumference of cross-section of the deformable ring that the ring abuts against said second named shoulder before it rolls completely over said clamping shoulder.

References Cited in the file of this patent

UNITED STATES PATENTS

| Number | Name | Date |
|---|---|---|
| 1,502,673 | Hole | July 29, 1924 |
| 2,063,967 | Whittam | Dec. 15, 1936 |
| 2,367,409 | Kuhler | Jan. 16, 1945 |
| 2,380,797 | Severin | July 31, 1945 |

FOREIGN PATENTS

| Number | Country | Date |
|---|---|---|
| 32,426 | Austria | Apr. 10, 1908 |
| 204,333 | Great Britain | July 31, 1924 |